(12) United States Patent
Blake et al.

(10) Patent No.: US 7,489,308 B2
(45) Date of Patent: Feb. 10, 2009

(54) DETERMINING THE LOCATION OF THE TIP OF AN ELECTRONIC STYLUS

(75) Inventors: Andrew Blake, Stapleford (GB);
Lyndsay Williams, Cambridge (GB);
James Srinivasan, West Yorkshire (GB);
William Vablais, Springfield, IL (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 10/367,485

(22) Filed: Feb. 14, 2003

(65) Prior Publication Data
US 2004/0160429 A1   Aug. 19, 2004

(51) Int. Cl.
*G09G 5/00* (2006.01)
(52) U.S. Cl. .................. 345/179; 345/173; 345/177; 178/18.04; 178/19.02; 178/19.07
(58) Field of Classification Search ............ 345/179, 345/173, 177; 178/19.07, 18.04, 19.02
See application file for complete search history.

(56) References Cited

U.S. PATENT DOCUMENTS 5,410,496 A * 4/1995 Bolon et al. .............. 703/7
5,717,168 A * 2/1998 DeBuisser et al. ....... 178/18.04
6,184,873 B1 * 2/2001 Ward et al. ............... 345/179
7,006,407 B2 * 2/2006 Davies et al. ............. 367/134

FOREIGN PATENT DOCUMENTS

JP    08-137610    * 5/1996

* cited by examiner

*Primary Examiner*—Richard Hjerpe
*Assistant Examiner*—Leonid Shapiro

(57) ABSTRACT

An electronic stylus system includes an electronic stylus and base receiving unit. The electronic stylus includes a first ultrasonic transmitter, a second ultrasonic transmitter, an electromagnetic transmitter, and a writing tip. The base receiver unit includes a first ultrasonic receiver, a second ultrasonic receiver, and an electromagnetic receiver. The ultrasonic receivers of the base unit are operable to receive signals transmitted by the ultrasonic transmitters of the electronic stylus. Similarly, the electromagnetic receiver of the base unit is operable to receive signals transmitted by the electromagnetic transmitter of the stylus. The location of the tip of the electronic stylus relative to a given reference point is determined using the locations of two ultrasonic transmitters relative to the two ultrasonic receivers.

16 Claims, 8 Drawing Sheets

DETERMINING THE LOCATION OF THE TIP OF AN ELECTRONIC STYLUS

TECHNICAL FIELD

The field of the invention relates generally to electronic styli, and more particularly to systems and methods for accurately locating and recording the position of the tip of an electronic stylus while the electronic stylus is in use.

BACKGROUND

Laptop computers are becoming increasingly popular for use by people who must travel or work in locations where desktop computers are not available or practical. Today's laptops are often just as powerful and feature-rich as many desktops. For example, many laptops now come equipped with large displays and full size keyboards. Although laptop computers are quite useful in appropriate situations, they are often either too large and/or too heavy to be used in remote locations, or where space is limited. Furthermore, battery life in laptop computers is typically only about 2-4 hours, further limiting their usefulness in remote locations. Finally, laptop computers may simply be overkill in situations where data entry is all that is required.

One alternative to the laptop computer for mobile data entry is the personal digital assistant (PDA). Unlike laptops, which use a computer keyboard for data entry, PDAs typically employ a stylus that is used to write on the screen of the PDA. The writing is then captured and processed using handwriting recognition software in the PDA. Unfortunately, the screens on most PDAs are relatively small, thus limiting the amount of text or data that can be entered and viewed at once. Furthermore, many PDAs require a user to learn and employ a special alphabet when inputting handwritten text.

A recent alternative to both the laptop and the PDA for mobile data entry is what is referred to as a pen based text entry system, or a digital pen. Digital pens typically allow users to write or draw on a pad of paper, and capture that writing or drawing to memory within the pen, or in an attached device, such as a PDA. The writing or drawing can then be transferred at a later time to a conventional computer for processing, such as handwriting recognition.

There are a number of ways in which digital pens capture text or writing. One such way involves the use of a tiny camera located within the pen to capture text or data as it is being written. These "camera based" pens require the use of special paper, which has a series of microscopic dots spaced throughout the paper. As a user writes on the paper with the pen, a tiny camera near the tip of the pen captures images of the dot pattern. A processor in the pen then uses the captured images to mathematically determine where the point of the pen was on the page at the moment the images were captured. By examining the changing dot patterns from image to image, the pen creates a virtual trail of where the pen tip has been. From this data, a record can be made of the path the pen has taken across the paper.

Unfortunately, these "camera based" digital pens have a number of drawbacks. The most significant of these drawbacks is the fact that special "dotted" paper must be used for the pen to function. This special paper is more expensive than standard paper. Additionally, this special paper is often not readily available. As such, to practically use a camera based digital pen, this special paper must be carried with you at all times.

One alternative to these camera based digital pens is an ultrasonic type digital pen. Current ultrasonic type digital pens employ a single ultrasonic transmitter in the pen that transmits an ultrasonic signal to an ultrasonic receiver unit, which is typically clipped or attached to a pad of paper. The ultrasonic receiver unit typically includes two ultrasonic receivers for receiving the signal transmitted from the pen. Using simple 2-dimensional triangulation techniques, the location of the tip of the pen on a 2-dimensional plane, such as a sheet of paper, can be determined.

Unfortunately, these ultrasonic type digital pens are not very accurate in determining the precise location of the pen tip during writing and drawing. The primary reason for this lack of accuracy relates to the position of the ultrasonic transmitter in the pen. Due to the size of the ultrasonic transmitter and the dimensions of the pen, the ultrasonic transmitter must be located some distance from the pen tip. This is not a problem when the pen is held in a perfectly perpendicular orientation relative to the paper. Held in this manner, the transmitter is aligned directly over the pen tip and, thus, in the same location in the 2-dimensional plane as the pen tip. However, when the pen is tilted the transmitter will no longer be aligned directly over the pen tip. Rather, the transmitter will be located some distance away from the pen tip in the 2-dimensional space. Since the receiver records the position of the transmitter, rather than the location of the pen tip, an inaccurate tip location will be recorded whenever the pen is tilted, which occurs naturally during writing.

Accordingly, there is a need for pen-based, mobile data capture system that accurately records the position of the tip of the pen, rather than the location of the transmitter and that does not require the use of special paper.

SUMMARY OF THE INVENTION

Described herein are embodiments of various systems and methods for accurately determining the location of the tip of an electronic stylus. In accordance with one embodiment, an electronic stylus system includes an electronic stylus and base receiving unit. The electronic stylus includes two or more ultrasonic transmitters, an electromagnetic transmitter, and a writing tip. The base receiver unit includes two or more ultrasonic receivers and an electromagnetic receiver. The ultrasonic receivers of the base unit are operable to receive signals transmitted by the ultrasonic transmitters of the electronic stylus. Similarly, the electromagnetic receiver of the base unit is operable to receive signals transmitted by the electromagnetic transmitter of the stylus.

Another embodiment relates to a method of locating the position of the tip of an electronic stylus relative to a given reference point. In accordance with this embodiment, the locations of two ultrasonic transmitters in the electronic stylus s are first determined relative to the given reference point. The position of the tip of the stylus relative to a given reference point is then determined using the determined positions of the two ultrasonic transmitters and various geometries of the electronic stylus.

BRIEF DESCRIPTION OF THE DRAWINGS

To facilitate understanding, identical reference numerals have been used, where possible, to designate identical elements that are common to the figures.

DETAILED DESCRIPTION

The following description sets forth specific embodiments of an electronic stylus system and method that incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

In general, the described embodiments relate to systems and methods for accurately capturing and recording the location of the tip of a stylus while the stylus is being used for writing or drawing on conventional writing paper, or the like. In accordance with various embodiments described herein, the stylus, referred to herein as the electronic stylus, includes at least two ultrasonic transmitters and at least one electromagnetic transmitter, each of which transmits signals when the stylus is being used for writing or drawing. A base unit, including at least two ultrasonic receivers and at least one electromagnetic receiver, is then used to receive the ultrasonic and electromagnetic signals transmitted from the electronic pen. These ultrasonic and electromagnetic signals, together with the fixed distance between the ultrasonic transmitters in the pen, the fixed distance between the ultrasonic receivers in the base unit, and the location of the stylus tip in the pen, are then used to determine the precise position of the stylus tip during writing or drawing operations.

Systems and methods relating to the form and use of electronic styluses, electronic stylus systems, and methods for use thereof, will now be described in detail with reference to a few embodiments, as illustrated in the accompanying drawings. In the following description, numerous specific details are set forth in order to provide a thorough understanding of these embodiments. It will be apparent, however, to one skilled in the art that these embodiments may not include, or may be practiced without, some or all of these specific details. In other instances, well known process steps or electronic or mechanical systems have not been described in detail in order to avoid unnecessarily obscuring the description of these embodiments.

Figure 1:
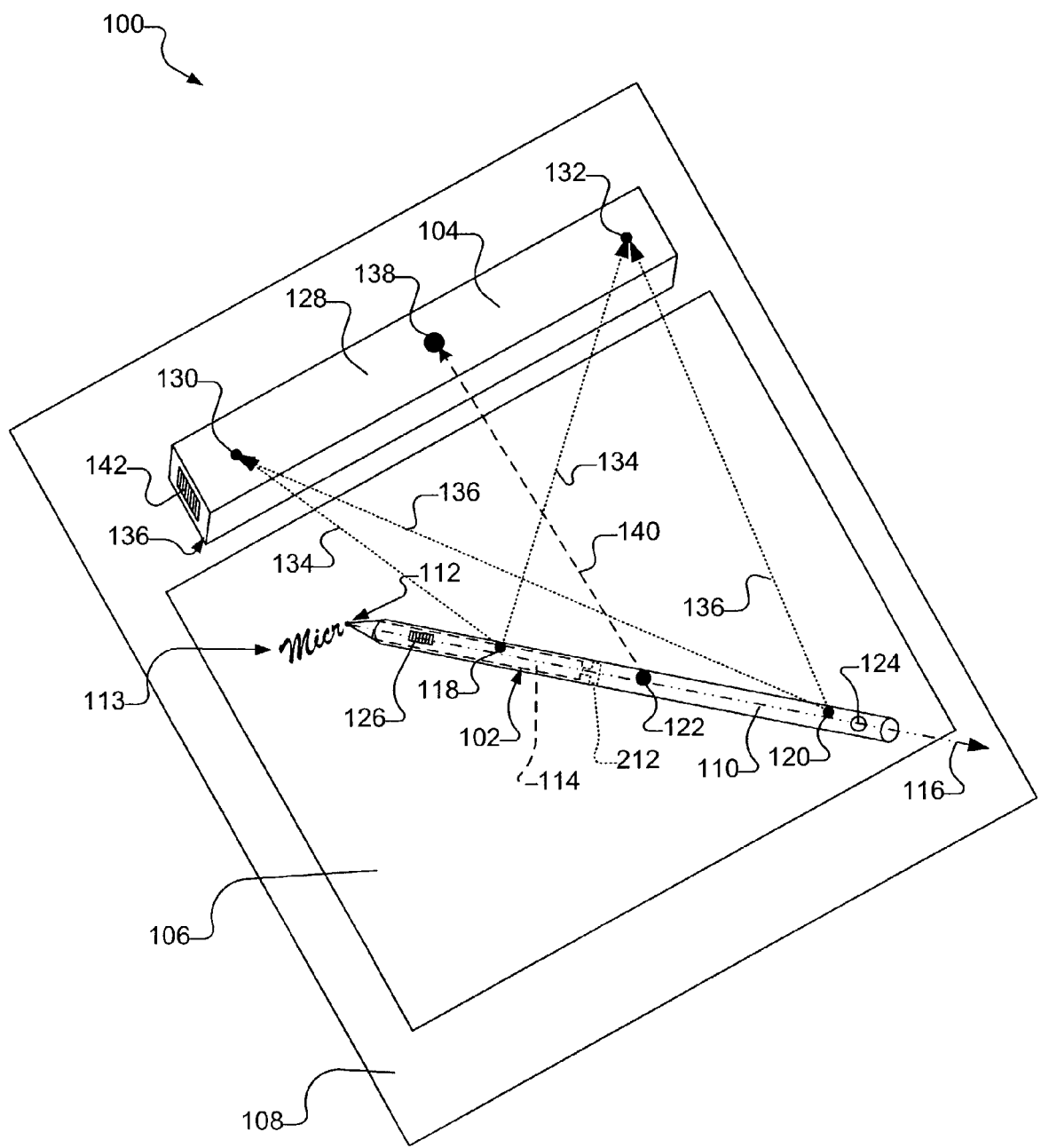
FIG. 1 is a perspective view of an electronic stylus system including an electronic stylus and an electronic stylus base module.

Turning first to FIG. 1, illustrated therein is an exemplary electronic stylus system 100 in accordance with one embodiment of the present invention. The electronic stylus system 100 includes an electronic stylus 102 and an associated electronic stylus base unit 104 (base unit). The electronic stylus system 100 is shown in an exemplary operating environment, including writing material 106, such as a piece or pad of paper, and a writing surface 108, such as a table top or other rigid surface.

As shown in FIG. 1, the electronic stylus 102 includes a stylus body 110 and a writing or stylus tip 112 located at one end of the stylus body 110. In one embodiment, the electronic stylus 102 includes a mechanism 114 for holding and dispensing ink or lead (graphite) through the stylus tip 112. For example, the mechanism 114 may comprise an ink cartridge or lead dispenser disposed within the stylus body 110 and operably connected to the stylus tip 112. In this embodiment, the stylus and ink (lead) may then used in a conventional manner for writing or drawing on the writing material 106. This conventional usage of the electronic stylus 102 may occur alone, or in conjunction with the transmission of ultrasonic and/or electromagnetic signals, as described in detail below. In other embodiments, the stylus tip 112 may function simply as a stylus for the electronic capture of writing or drawing strokes, without dispensing ink or lead. For example, the electronic stylus may me used as a replacement for the electromagnetic digitizer in a tablet PC or PDA.

Also included in the electronic stylus 102 are a first ultrasonic transmitter 118 and a second ultrasonic transmitter 120. Preferably, both ultrasonic transmitters 118 and 120 are omni-directional type ultrasonic transmitters, which transmit signals in both horizontal and vertical planes. The ultrasonic transmitters 118 and 120 generate sound waves or signals above the human ear's audibility limit of about 20 kHz. In one embodiment, the ultrasonic transmitters 118 and 120 transmit sound waves between approximately 30-120 kHz, and more particularly at approximately 80 kHz. The sound waves transmitted by the ultrasonic transmitters may include, or have encoded therein, various data. For example, in one embodiment, the sound waves transmitted by one or more of the ultrasonic transmitters 118 and/or 120 will include or embody data identifying the particular electronic stylus that is transmitting the ultrasonic signals, such as a stylus identification number. In other embodiments, the sound waves transmitted by the ultrasonic transmitters 118 and/or 120 may include or embody other types data.

As shown in FIG. 1, the first and second ultrasonic transmitters 118 and 120 are embedded or held in the stylus body 110 at a predetermined distance from one another. Preferably, the first and second ultrasonic transmitters 118 and 120 and the stylus tip 112 are all aligned or oriented in the stylus body 110 along a single axis 116. Also embedded or held in the stylus body 110 is an electromagnetic transmitter 122.

In one embodiment, the electromagnetic transmitter 122 is an infrared (IR) transmitter operable to transmit electromagnetic waves having a frequency range above that of microwave, but below the visible spectrum. For clarity, the electromagnetic transmitter 122 will herein after be referred to as the IR transmitter 122, rather than the electromagnetic transmitter 122. However, it should be understood that the electromagnetic transmitter 122 may alternatively comprise other types of electromagnetic transmitters operable to transmit waves having frequency ranges other than the IR spectrum. The IR signal transmitted by the IR transmitter 122 may include, or have encoded therein, various data. For example, in one embodiment, the signal transmitted by the IR transmitter 122 will include or embody data identifying the particular electronic stylus that is transmitting the IR signals, such as an IR transmitter identification number. Additionally, as described in detail below, the signal transmitted by the IR transmitter 122 may include information specifying which of the ultrasonic transmitters 118 or 120 is currently transmitting, or is about to transmit. In other embodiments, the signal transmitted by the IR transmitter 122 may include or embody other data.

In addition to the ultrasonic and IR transmitters, the electronic stylus 102 may also include a stylus indicator lamp 124 and a function switch 126, both of which are embedded or held in the stylus body 110. In one embodiment, the stylus indicator lamp 124 comprises a visible LED (light emitting diode) that functions to indicate a low power condition in the electronic stylus 102. In other embodiments, the stylus indicator lamp 124 may be indicative of other operational functions or states of the electronic stylus 102.

In one embodiment, the function switch 126 provides a means by which a user of the stylus may select various operational functions of the electronic stylus system 100. For example, in one embodiment, the function switch has two operational states that can be selected by a user of the stylus 102. In this embodiment, the two states may comprise a quiescent state, where no signal is received or detected by the stylus controller from the function switch, and an indicator state where a signal is received or detected by the stylus controller from the function switch. For example, in this embodiment, the second state may be used to indicate some break or delineation point in the operation of the pen, such as a page change. The controller may then be operable to cause the IR transmitter 122 to send an signal having encoded therein the state of the function switch.

As previously described, the electronic stylus 102 may be used in a conventional manner using ink or lead (graphite) for writing or drawing on the writing material. As also described, in accordance with the present invention, the electronic stylus 102 may be used to transmit ultrasonic and IR signals to the base unit 104 via the first ultrasonic transmitter 118, the second ultrasonic transmitter 120, and the IR transmitter 122.

Figure 2:
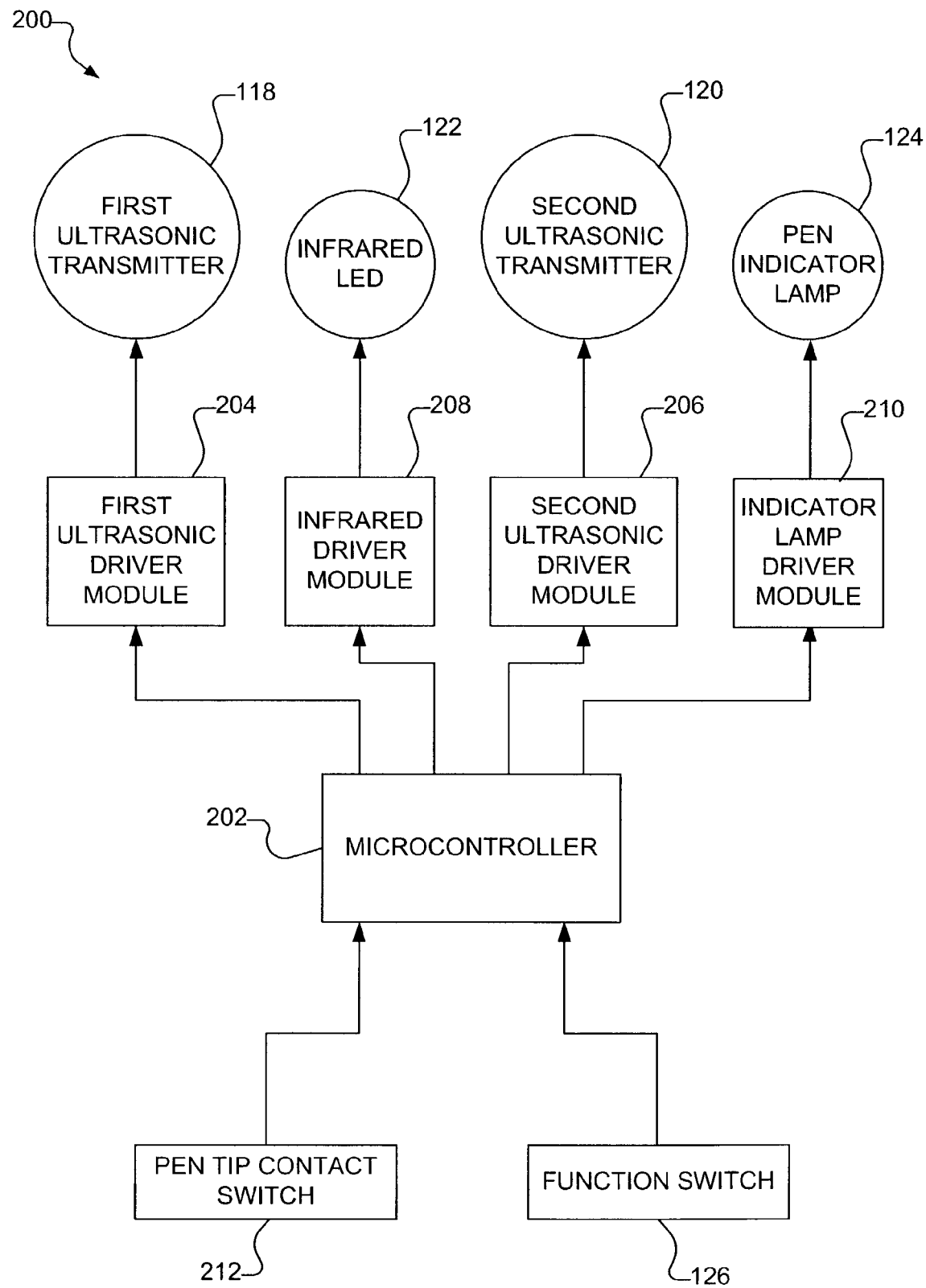
FIG. 2 is a block diagram illustrating various operational components of the electronic stylus depicted in FIG. 1.

Turning now to FIG. 2, illustrated therein are various exemplary operational components 200 of the electronic stylus 102. As shown in FIG. 2, and in accordance with one embodiment of the electronic stylus 102, the operational components 200 may include a stylus microcontroller 202, a first ultrasonic driver module 204, a second ultrasonic driver module 206, an IR driver module 208, a stylus indicator lamp driver module 210, stylus tip contact switch 212, and the function switch 126. As shown, each of the driver modules 204, 206, 208, and 210, as well as the stylus tip contact switch 212 and the function switch 126, is operably connected to the microcontroller 202. Additionally, each of the driver modules is connected to an associated ultrasonic transmitter, IR transmitter, or indicator lamp. Specifically, the first ultrasonic driver module 204 is connected to the first ultrasonic transmitter 118, the second ultrasonic driver module 206 is connected to the second ultrasonic transmitter 120, the IR driver module 208 is connected to the IR transmitter 122, and the stylus indicator lamp driver module 210 is connected to the stylus indicator lamp 124.

In operation, each of the ultrasonic driver modules is operable to receive a signal from the stylus microcontroller 202 and, in turn, generate high amplitude electrical pulses that drive its associated ultrasonic transmitter. Likewise, the IR driver module 208 is operable to receive a signal from the stylus microcontroller 202 and, in turn, generate appropriate signals to drive the IR transmitter 122. The stylus indicator lamp driver module 210 is operable to receive a signal from the stylus microcontroller 202 and, in turn, generate appropriate signals to drive the stylus indicator lamp 124. In one embodiment, the stylus indicator lamp 124 comprises a visible LED.

The stylus tip contact switch 212 is operable to indicate when the stylus tip 112 is in contact with a firm surface, such as when the stylus 102 is being used to write or draw on the writing material 106. The stylus tip contact switch 212 is positioned in the stylus body 110 in such a way as to have a force exerted thereon when the stylus tip 112 is in contact with a firm surface. For example, as shown in FIG. 1, in one embodiment, the stylus tip contact switch 212 is positioned at an end of the mechanism 114 that dispenses the ink or lead through the stylus tip 112. Positioned in such a manner, a force will be exerted on the stylus tip contact switch 212, through the mechanism 114, when the stylus tip 112 is in contact with the writing material 106. In other embodiments, the stylus tip contact switch 212 may be positioned in other locations within the stylus body, so long as a force will be exerted on the stylus tip contact switch 212 when the stylus tip 112 is in contact with a firm surface.

When a force of a specified magnitude is exerted on the stylus tip contact switch 212, the stylus tip contact switch 212 will enter an engaged state. In this engaged state, the stylus tip contact switch 212 will indicate to the microcontroller 202 that the tip 112 of the stylus is in firm contact with the writing material. As will be appreciated, the pressure switch may either produce a signal indicative of the engaged state or, alternatively, the switch may indicate the engaged state by allowing the passage of current through the switch. The stylus tip contact switch 212 may be of a number of suitable switch or sensor types. For example, in one embodiment, the stylus tip contact switch 212 comprises a zero-movement resistive switch, also known in the art as a pressure switch. In another embodiment the contact switch 212 comprises an analog or digital pressure sensor.

As will be appreciated, the stylus microcontroller 202 operates or controls the various components connected thereto in accordance with instructions embodied in software and/or firmware. More particularly, the software and/or firmware controlling the microcontroller 202 dictates the timing, duration, and type of signals that are sent by the microcontroller 202 to the first ultrasonic driver module 204, the second ultrasonic driver module 206, the IR driver module 208, and the stylus indicator lamp driver module 210. Similarly, the software and/or firmware dictates how the microcontroller 202 responds to signals received from the stylus tip contact switch 212 and the function switch 126.

In accordance with one embodiment, the microcontroller 202 operates to cause the first and second ultrasonic transmitters to alternatively transmit ultrasonic signals, whenever the stylus tip contact switch 212 is in the engaged state, indicating that the stylus tip 112 is in contact with the writing material 106. That is, the microcontroller 202 operates to cause one ultrasonic transmitter and then the other ultrasonic transmitter, to transmit signals, in an alternating manner, while the stylus tip contact switch 212 is in the engaged state. Additionally, in accordance with this embodiment, the microcontroller 202 operates to cause the IR transmitter to transmit data indicating when, and which of the first or second ultrasonic transmitters is presently, or is about to, send an ultrasonic signal.

For example, in accordance with one embodiment, the stylus microcontroller 202 maintains a waiting state until such time as the stylus tip contact switch 212 enters the engaged state, indicating that the stylus tip 112 is in contact with the writing material 106. Upon determining that the contact switch has entered the engaged state, the microcontroller 202 then sends a signal to the IR driver module 208, which in turn sends a corresponding signal to the IR LED 122 for broadcast. In one embodiment, the signal sent to the IR driver module 208, and the corresponding signal that is broadcast by the IR LED 122, specifies that the first ultrasonic transmitter 118 is, or is about to, broadcast. Simultaneously, or near simultaneously, with the transmission by the microcontroller 202 of the signal to the IR driver module 208, the microcontroller 202 sends a signal to the first ultrasonic driver module 204. In turn, the first ultrasonic driver module 204 sends a corresponding signal to the first ultrasonic transmitter 118 for broadcast.

Next, the microcontroller 202 sends a signal to the driver module 208, which in turn sends a corresponding signal to the IR LED 122 for broadcast. In one embodiment, the signal sent to the IR driver module 208, and the corresponding signal that is broadcast by the IR LED 122, specifies that the second ultrasonic transmitter 120 is, or is about to, broadcast. Simultaneously, or near simultaneously, with the transmission by the microcontroller 202 of the signal to the IR driver module 208, the microcontroller 202 stops sending signals to the first ultrasonic driver module 118 and sends a signal to the second ultrasonic driver module 206. In turn, the second ultrasonic driver module 206 sends a corresponding signal to the second ultrasonic transmitter 120 for broadcast. This process of alternatively sending signals to the IR module 208 and the first ultrasonic driver module 204, and then sending signals to the IR module 208 and the second ultrasonic driver module 206, continues until the stylus tip contact switch 212 is no longer in the engaged state. That is, the signals continue to be sent by the microcontroller until the stylus tip 112 is no longer in sufficient contact with the writing material 106.

In accordance with another embodiment, the microcontroller 202 operates to cause the first and second ultrasonic transmitters to alternatively transmit ultrasonic signals continuously during use of the stylus. In this mode of operation, called a "hover" mode, the stylus tip contact switch 212 would not be used. Rather, the position of the stylus tip would continue to be tracked regardless of the state of the contact switch.

Returning now to FIG. 1, as shown therein, the base unit 104 includes a body portion 128 including a first ultrasonic receiver 130 and a second ultrasonic receiver 132. Both ultrasonic receivers 130 and 132 are operable to detect ultrasonic signals that are transmitted from both the first ultrasonic transmitter 118 and the second ultrasonic transmitter 120 of the electronic stylus 102. For example, as shown in FIG. 1, the first ultrasonic transmitter 118 of the stylus 102 is shown transmitting a first ultrasonic signal 134 that is received by both the first ultrasonic receiver 130 and the second ultrasonic receiver 132. Likewise, the second ultrasonic transmitter 120 of the stylus 102 is shown transmitting a second ultrasonic signal 136 that is received by both the first ultrasonic receiver 130 and the second ultrasonic receiver 132.

Also located in the body portion 128 of the base unit 104 is an electromagnetic receiver 138 that is operable to detect electromagnetic signals 140 from the electromagnetic transmitter 122 of the electronic stylus 102. In one embodiment, the electromagnetic receiver 138 is an infrared (IR) receiver operable to detect waves having a frequency range above that of microwave but below the visible spectrum. For clarity, the electromagnetic receiver 138 will herein after be referred to as the IR receiver 138, rather than the electromagnetic receiver 138. However, it should be understood that the electromagnetic receiver 138 may alternatively comprise other types of electromagnetic receivers operable to detect waves transmitted from the electromagnetic transmitter 122 having a frequency range other than the IR spectrum.

In addition to the ultrasonic receivers 130 and 132 and IR receiver 138, the base unit 104 also includes a data transfer port 142. As described in greater detail below, the data transfer port 142 provides a mechanism by which various types of data may be transferred from the base unit to another computing device or computing process. In accordance with one embodiment, the data transfer port 142 comprises a physical or wired connection port into which a cable may be plugged, so as to physically and electrically connect the base unit 104 to another computing device. For example, and without limitation, the data transfer port 142 may comprise a data communication port conforming to any of a number of well-known communication standards and protocols, e.g., parallel, serial, SCSI (small computer system interface), Firewire (IEEE 1394), USB, Ethernet, etc.

In accordance with another embodiment, the data transfer port 142 comprises a wireless connection port by which the base unit 104 may communicate to or with another computing device or computing process. For example, and without limitation, the data transfer port 142 may comprise a wireless data communication transmitter or transceiver that operates according to the IEEE 802.11x Wireless Networking standards, the "Bluetooth" standard, or according to other standard or proprietary wireless techniques. In accordance with another embodiment, the data transfer port 142 comprises a removable memory device, such a Flash RAM, memory stick, micro-drive, minidisk or other form of removable non-volatile storage.

Figure 3:
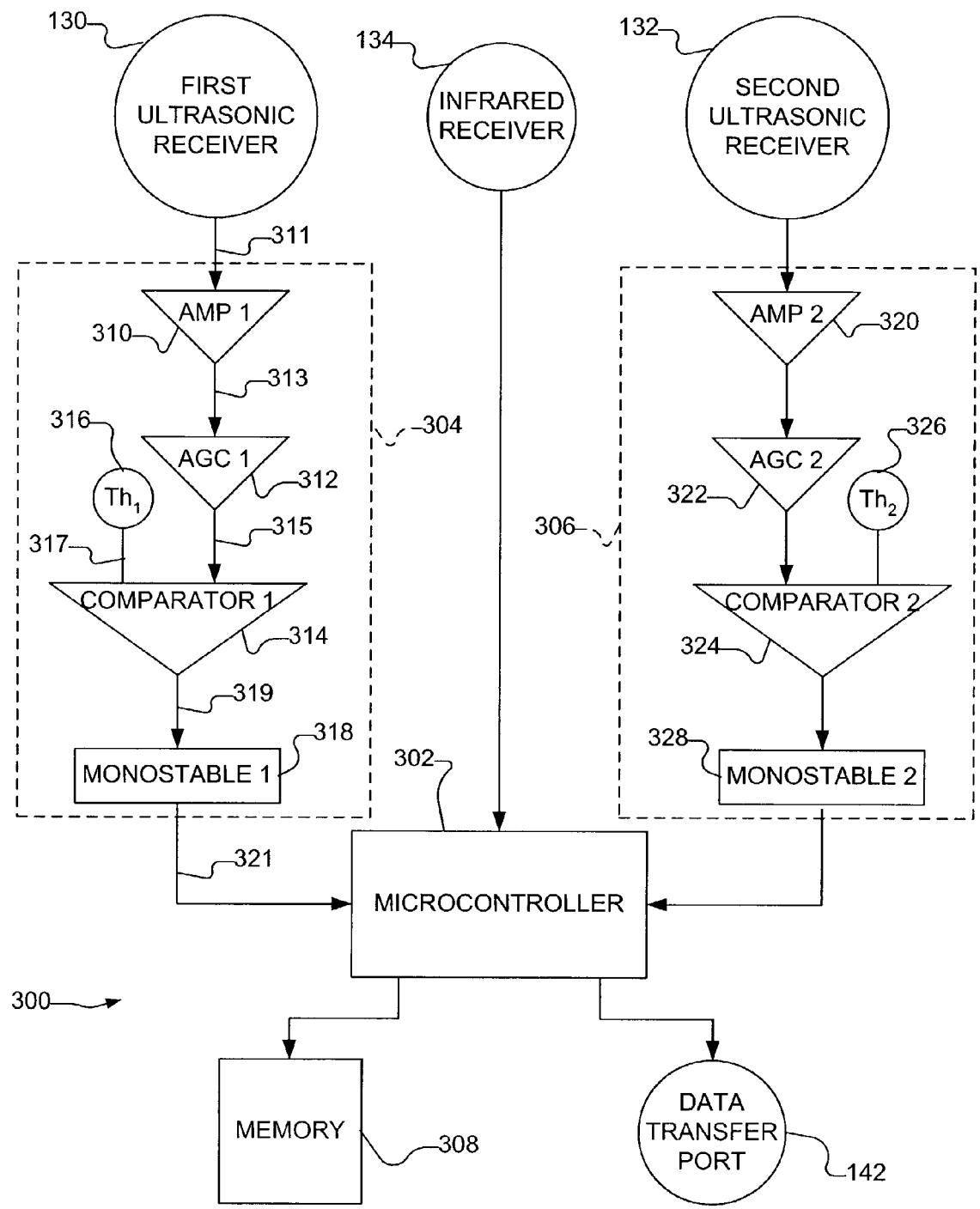
FIG. 3 is a block diagram illustrating various operational components of the electronic stylus base module depicted in FIG. 1.

Turning now to FIG. 3, illustrated therein are various exemplary operational components 300 of the base unit 104. In accordance with one embodiment, the operational components 300 include the previously described first ultrasonic receiver 130, second ultrasonic receiver 132, IR receiver 134, and data transfer port 142. Additionally, the operational components 300 of the base unit 104 also include a base unit microcontroller 302, a first receiver module 304, a second receiver module 306, and a memory 308. The memory 308 may be a discrete memory device or it may be incorporated in the microcontroller 302.

As shown in FIG. 3, the base unit microcontroller 302 is operably connected to the first ultrasonic receiver 130 via the first receiver module 304 and the second ultrasonic receiver 132 via the second receiver module 306. Additionally, the base unit microcontroller 302 is operably connected to a memory 308, the data transfer port 142, and the infrared receiver 134. In general, the base unit microcontroller 302 is operable to receive and process ultrasonic signals received at the first and second receiver modules 304 and 306 and infrared signals received at the infrared receiver module 134. The manner in which the microcontroller 302 processes these signals is described in greater detail below.

As shown, each of the receiver modules 304 and 306 includes a number of components for processing ultrasonic signals received from the first ultrasonic receiver 130 and second ultrasonic receiver 132, respectively, before the signals are received by the base unit microcontroller 302. For example, in one embodiment, each of the receiver modules 304 and 306 includes an amplifier 310 and 320, a automatic gain control (AGC) 312 and 322, a comparator 314 and 324, a threshold signal generator 316 and 326, and a monostable multivibrator 318 and 328. Since the components of the receiver modules 304 and 306 are identical, the operations of only the first receiver module 304 will be now described. It will be appreciated that the operations of the second receiver module 306 will be identical to the operations of the first receiver module 304.

With respect to the first receiver module 304, when an ultrasonic signal is received at the first ultrasonic receiver 130, the first ultrasonic receiver 130 generates a corresponding first signal 311 that is received at the amplifier (AMP1) 310. The amplifier 310 then amplifies the first signal 311 by a predetermined magnitude to produce an amplified signal 313. Next, the AGC 312 receives the amplified signal 313 and produces a corresponding gain controlled signal 315. Next, the gain controlled signal 315 is sent to the comparator 314, where it is compared to a predetermined threshold signal 317 provided by the threshold signal generator ($Th_1$) 316. If it is determined at the comparator 314 that gain controlled signal 315 is greater than the threshold signal 317, a trigger signal 319 is generated by the comparator 314, which then is received by the monostable multivibrator 318. The monostable multivibrator 318 then produces a signal pulse 321 of fixed duration for each pulse received at the input to the monostable multivibrator 318. This monostable signal 321 from the monostable multivibrator 318 is then received at the base unit microcontroller 302 for processing.

It should be understood that the specific components and functions of the receiver modules 304 and 306, which have been described, are exemplary only. Those skilled in the art will appreciate that the particular elements and the functions described with respect to the receiver module 304 may vary. All that is required of the receiver modules 304 and 306 is that they process or condition signals received by the first and second ultrasonic receivers 130 and 132 in a manner such that the signals may be received and used by the base unit microcontroller 302. Stated another way, all that is required of the receiver modules 304 and 306 is that they provide an appropriate interface between the first and second ultrasonic receivers 130 and 132 and the base unit microcontroller 302.

As previously described, in general, the base unit microcontroller 302 is operable to process the received ultrasonic and infrared signals. In particular, the microcontroller 302 is operable to determine the time required (time value) for an ultrasonic signal to travel from either the first ultrasonic transmitter 118 or the second ultrasonic transmitter 120 to either the first ultrasonic receiver 130 or the second ultrasonic receiver 132. As will be appreciated, these time values may be computed and stored in a number of ways. For example, the time values may be computed as counter values within the microcontroller 302. These time values can then be used in time-of-flight (TOF) calculations to determine the distance between the ultrasonic transmitters and receivers. TOF calculations use the speed of sound through air to calculate the distance between the transmitter of an ultrasonic signal and the receiver of that signal.

In accordance with one embodiment, the base unit computes and stores only the time values. These time values are then stored in the memory 308 and, at some later time, transferred to an external computing device using the data transfer port 142. In another embodiment, the base unit microcontroller 302 is operable to perform the time-of-flight (TOF) calculations to determine the distances between the ultrasonic transmitters and receivers. These TOF values are then stored in the memory 308 and, at some later time, transferred to an external computing device using the data transfer port 142. In yet another embodiment, the microcontroller 302 is operable to determine the precise position of the tip 112 of the stylus 102, according to methods that will now be discussed.

It will be appreciated that the precise speed of sound in a given environment may vary. In particular, the speed of sound is dependent on, among other things, the temperature and humidity level of the air through which the sound travels. As such, in various embodiments, the stylus 102 or the base unit may include sensors to measure environmental conditions, such as humidity and/or temperature. These measured environmental conditions may then be used to calculate a more precise value for the speed of sound for use in computing the TOF values.

An exemplary method for determining the precise position of the tip 112 of the stylus 102, relative to a given point will now be described. In accordance with one embodiment, the position of the tip 112 of the stylus 102 is determined relative to a point on the base unit 104. As previously mentioned, this method may be carried out, all or in part, in the base unit microcontroller 302, or all or in part in an external computing device. This method employs the previously discussed time values to establish the distance between the ultrasonic transmitters 118 and 120 and the ultrasonic receivers 130 and 132. From this information, together with the fixed distance between the ultrasonic transmitters 118 and 120, the fixed distance between the ultrasonic receivers 130 and 132, and the distance between the stylus tip and at least one of the ultrasonic receivers, a very precise determination can be made of position of the tip 112 of the stylus 102, relative to the base unit 104.

With respect to computing the distances between the ultrasonic transmitters 118 and 120 and the ultrasonic receivers 130 and 132 using TOF measurements, it will be appreciated that ultrasonic pulses travel at approximately 340 m/s, depending on temperature and humidity conditions. In addition, the IR signal will be transmitted simultaneously with the ultrasonic signals, or at a fixed time before or after the ultrasonic signals. For example, and without limitation, the IR signal may be transmitted between 1 and 5 microseconds before or after the ultrasonic signals. It will be appreciated that an IR signal transmitted from the IR transmitter of the electronic stylus will arrive at the IR receiver of the base unit 104 almost instantaneously. That is, relative to the time it takes for an ultrasonic signal to travel between the electronic stylus 102 and the base unit 104, an IR signal traveling between the electronic stylus 102 and the base unit 104 will effectively is be instantaneous.

With this in mind, the distance between a given ultrasonic transmitter and a given ultrasonic receiver can be determined by first issuing an IR signal from the IR transmitter 122 to the IR receiver 138. Simultaneously with the transmission of the IR signal, an ultrasonic signal is sent between the given ultrasonic transmitter and the given ultrasonic receiver. Using the microcontroller, or a simple timing circuit, the time (t) can then be determined simply by calculating the time between the receipts of the IR signal and the ultrasonic signal. The distance (d) between the given ultrasonic transmitter and the given ultrasonic receiver can then be calculated using Equation (1):

$$d = v_s \times t \quad \quad \text{Equation (1)}$$

In Equation (1), $v_s$ equals the speed of sound.

Figure 4:
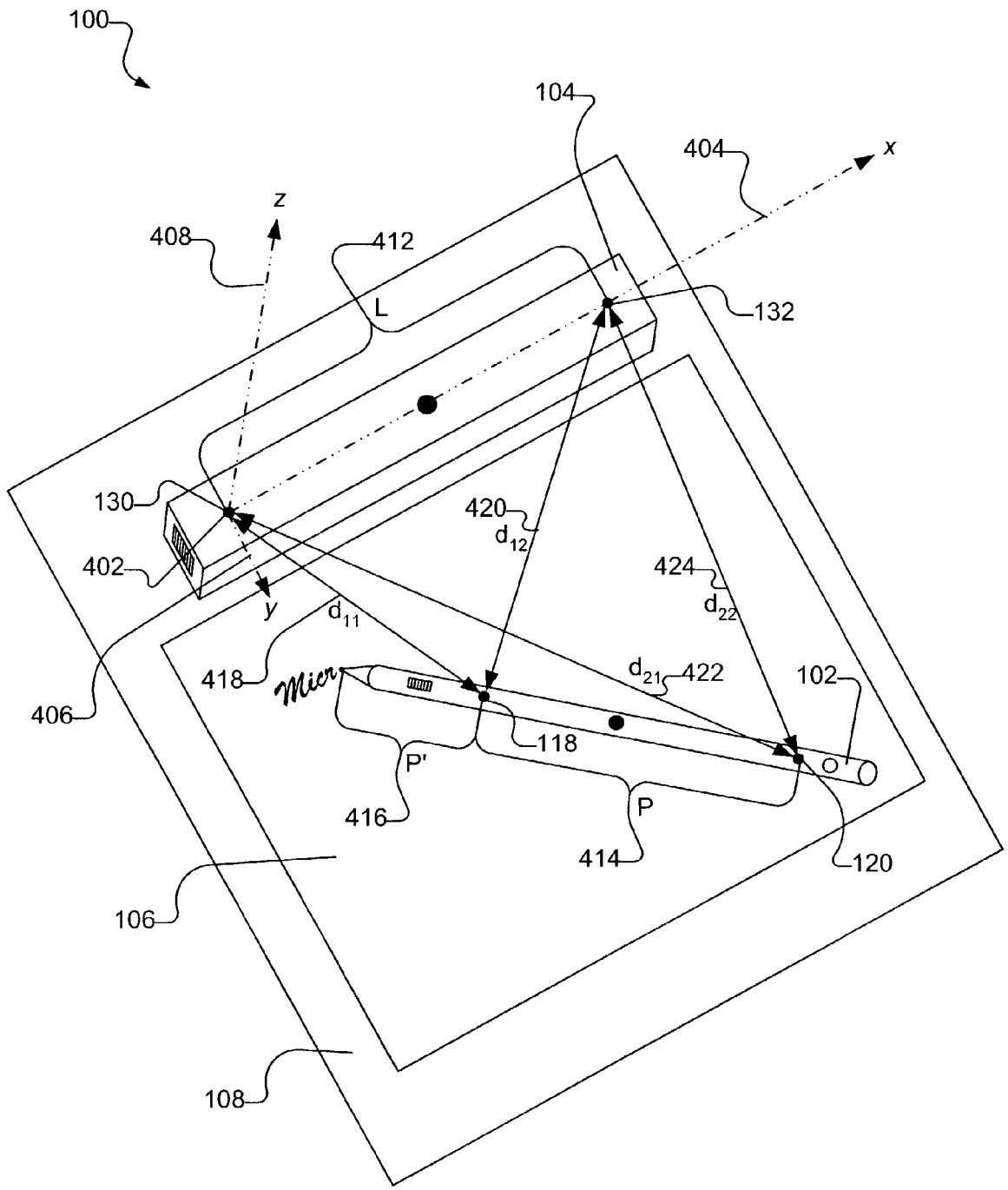
FIG. 4 is a perspective view of the electronic stylus system of FIG. 1, illustrating various dimensions that are used in determining the location of the tip of the electronic stylus depicted in FIG. 1.

Before proceeding with the discussion of operations for determining the location of the stylus tip 112 relative to a given point, it will be helpful to first establish various nomenclature, dimensions, and a reference coordinate system, with respect to which the location of the stylus tip 112 may be determined. Turning then to FIG. 4, an origin 402 of an xyz-coordinate system is shown located at the first ultrasonic receiver 130. As shown, the x-axis 404 passes through the first ultrasonic receiver 130 and the second ultrasonic receiver 132. The y-axis 406 passes through the first ultrasonic receiver 130 and, together with the x-axis 404, forms a plane substantially parallel with the writing surface 108 and the writing material 106. The z-axis 408 then extends through the origin 402 at the first ultrasonic receiver 130, perpendicular to both the x-axis 404 and the y-axis 406. Those skilled in the art will appreciate the orientation of the xyz-coordinate system shown in FIG. 4 is selected for convenience, and that other orientations of the xyz-coordinate system may be used. Additionally, the origin of the coordinate system may be established at a location other than at the first ultrasonic receiver. Furthermore, other coordinate systems, such as non-Cartesian coordinate systems may be used.

Also shown in FIG. 4 are various dimensions that may be used in the determination of the location of the stylus tip 112, in accordance with the present invention. For example, the distance between the first and second ultrasonic receivers 130 and 132 is denoted as L 412. The distance between the first and second ultrasonic transmitters 118 and 120 is denoted as P 414. The distance between first ultrasonic transmitter 118 and the stylus tip 112 is denoted P' 416.

As previously described, the distance between an ultrasonic receiver and an ultrasonic transmitter may be determined using Equation (1) above. The variables related to these distances are also shown in FIG. 4 as follows. The distance between the first ultrasonic transmitter 118 and the first ultrasonic receiver 130 is denoted as $d_{11}$ 418. The distance between the first ultrasonic transmitter 118 and the second ultrasonic receiver 132 is denoted as $d_{12}$ 420. The distance between the second ultrasonic transmitter 120 and the first ultrasonic receiver 130 is denoted as $d_{21}$ 422. The distance between the second ultrasonic transmitter 120 and the second ultrasonic receiver 132 is denoted as $d_{22}$ 424.

Figure 5:
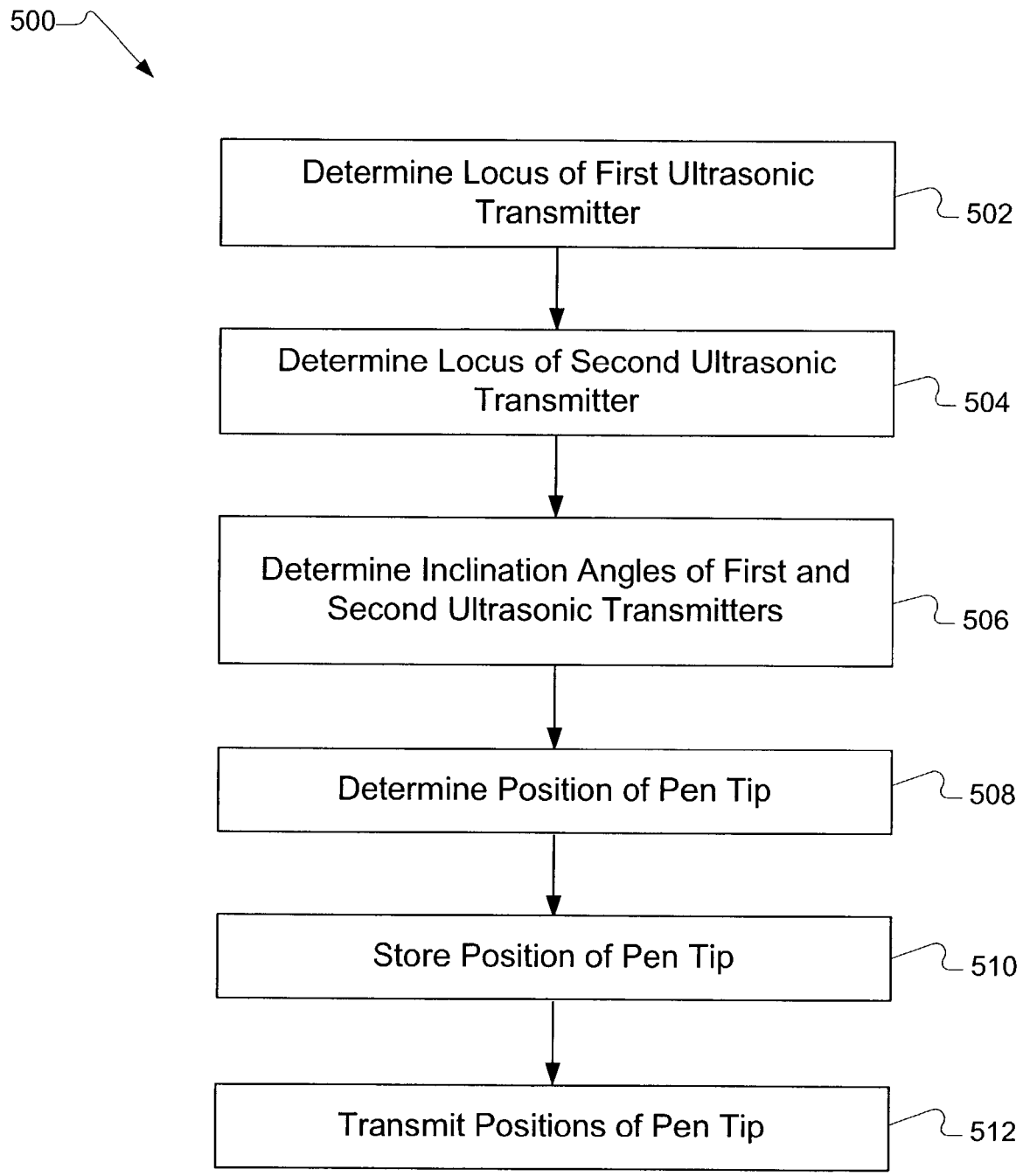
FIG. 5 illustrates operations for determining the position of the tip of the electronic stylus depicted in FIG. 1.
Figure 6:
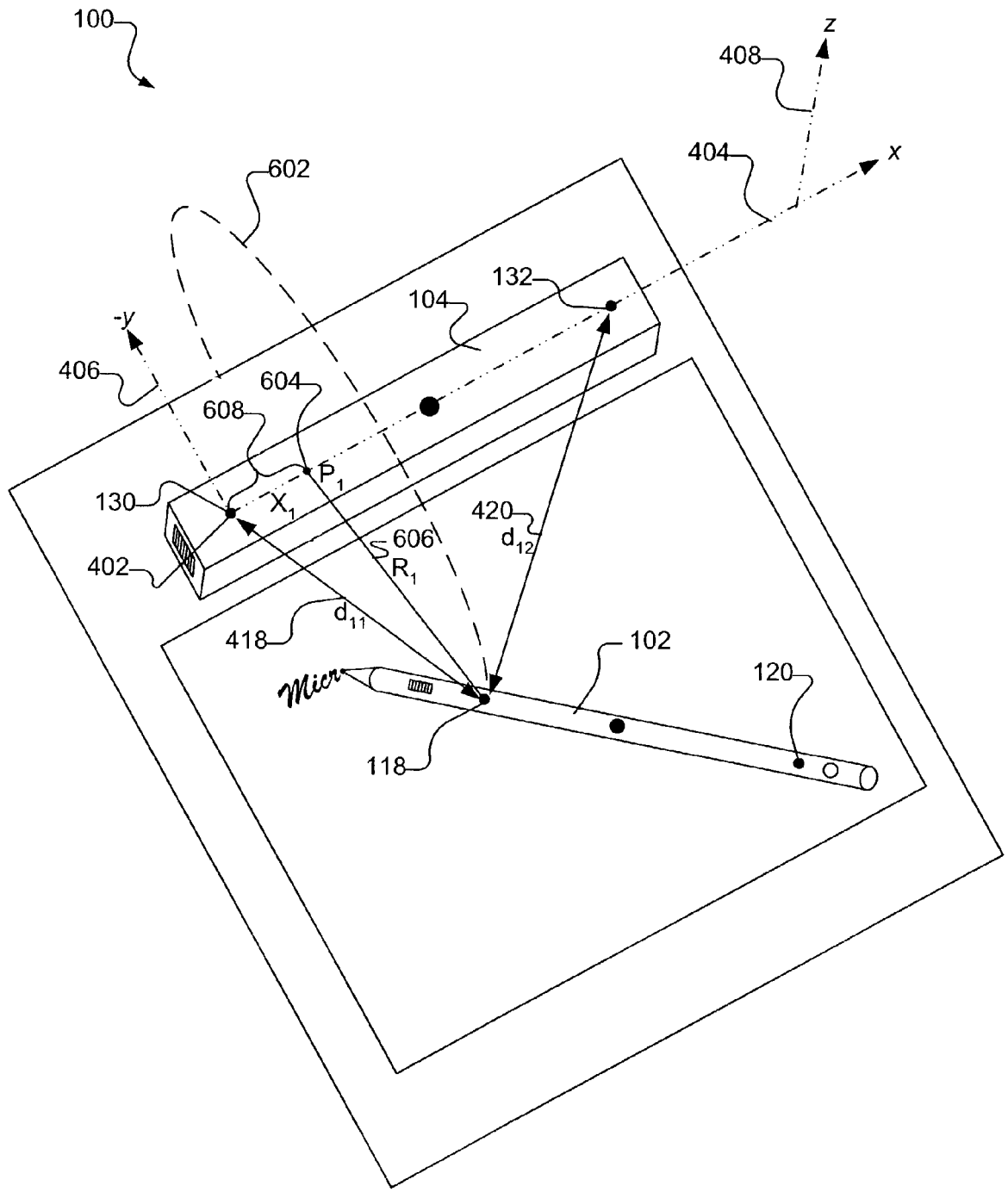
FIG. 6 is a perspective view of the electronic stylus system of FIG. 1 illustrating various parameters and measurements used or calculated in determining the position of the tip of the electronic stylus depicted in FIG. 1.
Figure 7:
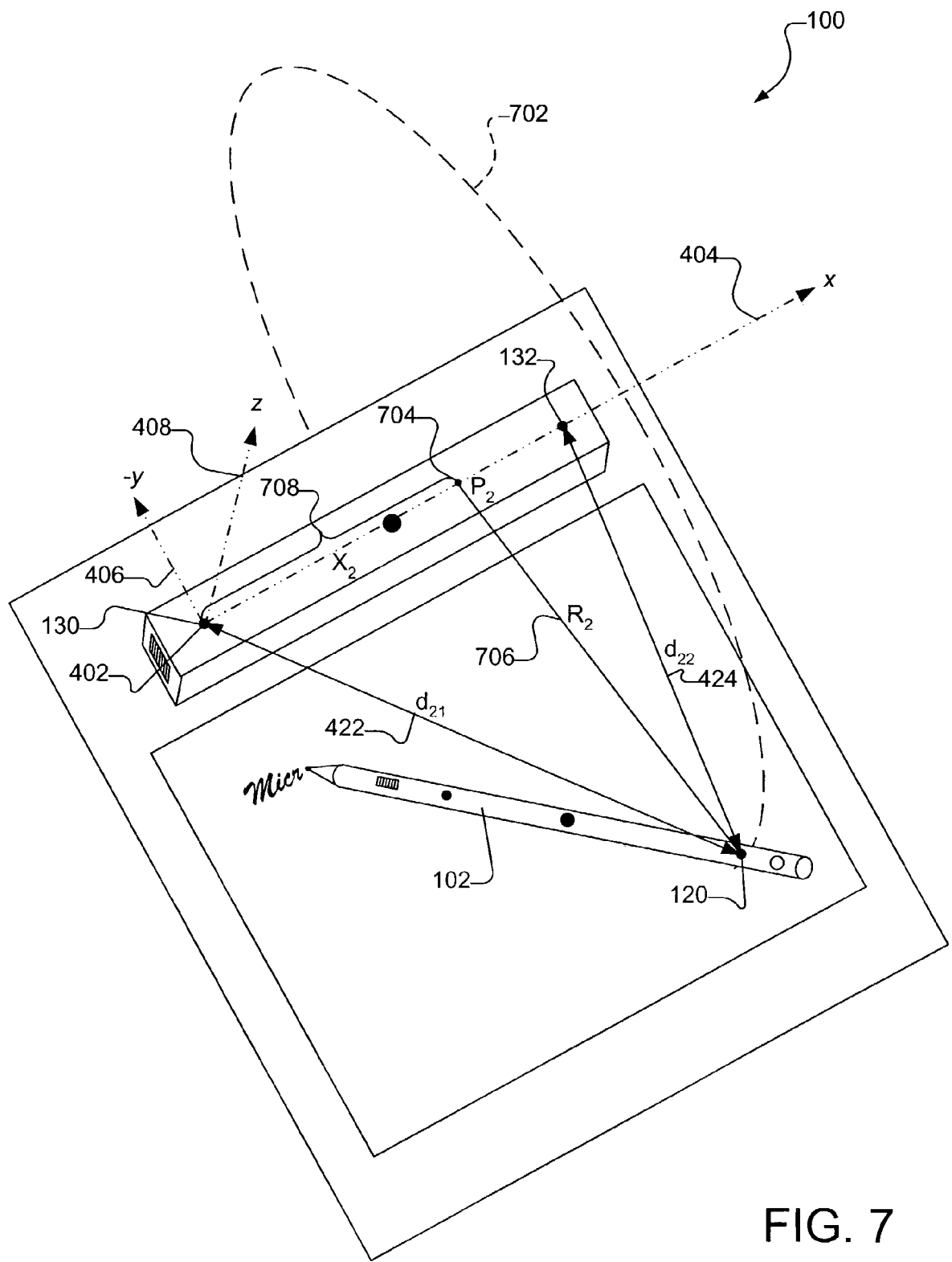
FIG. 7 is a perspective view of the electronic stylus system of FIG. 1 illustrating various other parameters and measurements used or calculated in determining the position of the tip of the electronic stylus depicted in FIG. 1.
Figure 8:
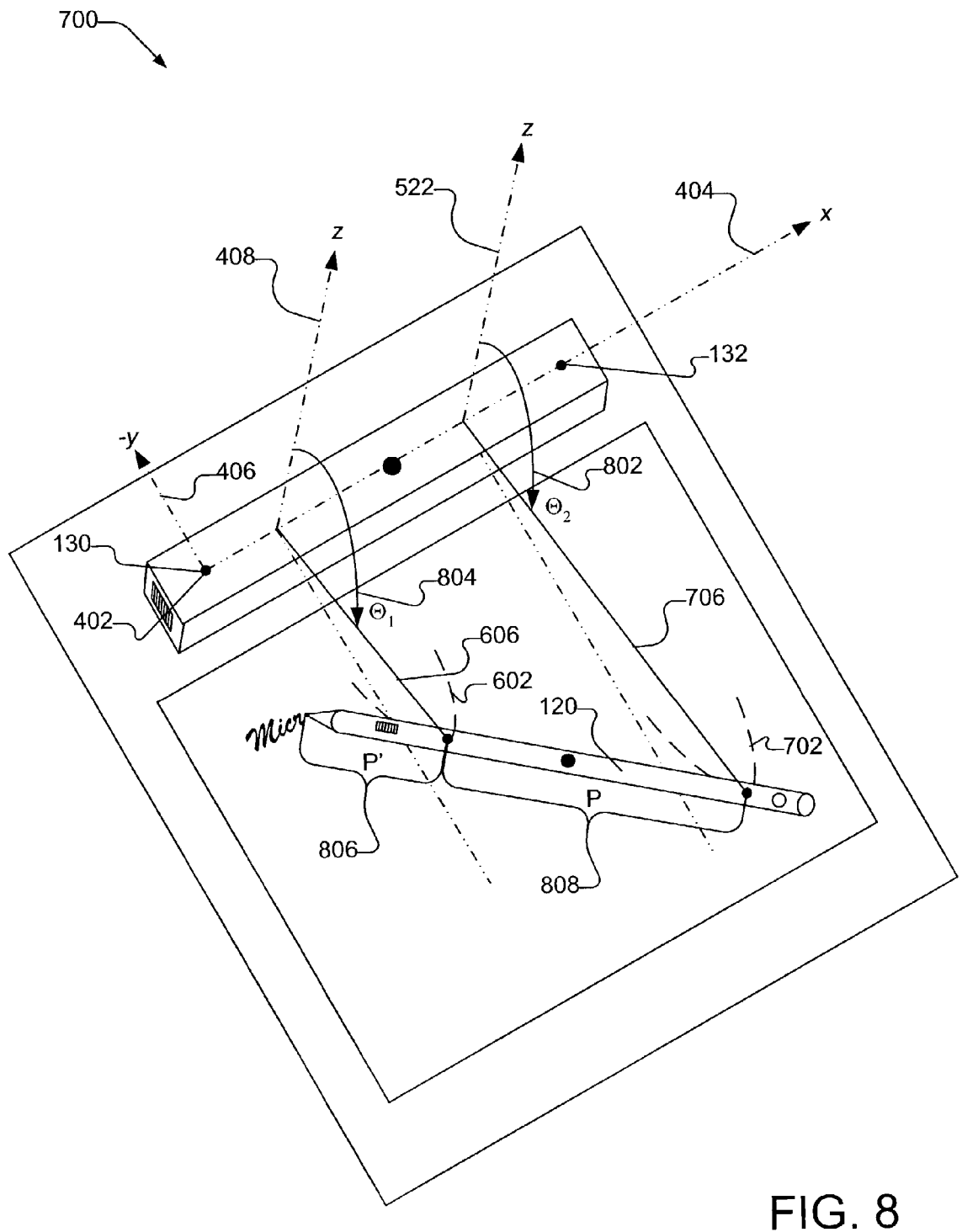
FIG. 8 is a perspective view of the electronic stylus system of FIG. 1 illustrating yet other parameters and measurements used or calculated in determining the position of the tip of the electronic stylus depicted in FIG. 1.

Having established a coordinate system and appropriate nomenclature, an exemplary method for determining the location of the stylus tip 112 will now be described. Turning now to FIG. 5, shown therein is a flow chart 500 illustrating exemplary operations that may be performed in determining the precise location of the stylus tip 112 of the electronic stylus 102, relative to the x-y-z coordinate system described above with respect to FIG. 4, when the stylus tip is in contact with the writing material 106. FIGS. 6-8 illustrate how the various operations illustrated in FIG. 5 physically and spatially relate to the electronic stylus system 100.

As previously mentioned, in one embodiment, the operations illustrated in the flow chart 500 may be performed, all or in part, in or by the base unit microcontroller 302. In other embodiments the operations may be performed in other microcontroller(s), processor(s), computing device(s) or computing systems. The operations may be implemented (1) as a sequence of processor-implemented steps and (2) as interconnected machine modules. The implementation is a matter of choice, dependent on performance and/or application requirements. Accordingly, the operations making up the embodiments described herein are referred to variously as operations, steps, objects, or modules.

As shown in FIG. 5, at the start of the operations 500, a first locus determination operation 502 determines the locus of the first ultrasonic transmitter 118 (the "first locus"). As used herein, a first locus 602 (FIG. 6) is a circle of coplanar points equidistant from a center point $P_1$ 604, having a radius $R_1$ 606. As shown in FIG. 6, the first locus 602 comprises all of the possible points where the first ultrasonic transmitter 118 could be, given a computed distances $d_{11}$ 418 between the first ultrasonic transmitter 118 and the first ultrasonic receiver 130, and a computed distance $d_{12}$ 420 between the first ultrasonic transmitter 118 and the second ultrasonic receiver 132.

The plane on which the first locus 602 resides is parallel to the y-axis 406 and perpendicular to the x-axis 404. The first center point $P_1$ 604 is the point at which the plane defined by the first locus 602 intersects the x-axis 404. As shown in FIG. 6, the first center point $P_1$ 604 is located at a distance $X_1$ 608 from the origin 402 on the x-axis 404.

As will be appreciated from the foregoing description, the first locus 602 may be defined by specifying the distance $X_1$ 608 and the radius $R_1$ 606. As such, in accordance with one embodiment, the first locus determination operation 502 comprises determining $X_1$ 608 and $R_1$ 606. In accordance with one embodiment, the determination of $X_1$ 608 and R1 606, and hence the determination of the first locus 602, may be made using Equations (2)-(4):

$$L'_1 = \frac{1}{L}((d_{11})^2 - (d_{12})^2) \qquad \text{Equation (2)}$$

$$X_1 = \frac{L + L'_1}{2} \qquad \text{Equation (3)}$$

$$R_1 = \sqrt{(d_{11})^2 - X_1^2} \qquad \text{Equation (4)}$$

As will be appreciated by those skilled in the art, there are a number of ways to implement Equations (2)-(4) in the software and/or firmware. As such, first locus determination operation 502 is not intended to be limited to any one particular implementation of Equations (2)-(4).

Next, a second locus determination operation 504 determines the locus of the second ultrasonic transmitter 120 (the "second locus"). As with the first locus 602, the second locus 702 (FIG. 7) is a circle of coplanar points equidistant from a center point $P_2$ 704, having a radius $R_2$ 706. As shown in FIG. 7, the second locus 702 comprises all of the possible points where the second ultrasonic transmitter 120 could be, given a computed distances $d_{21}$ 422 between the second ultrasonic transmitter 120 and the first ultrasonic receiver 130, and a computed distance $d_{22}$ 424 between the second ultrasonic transmitter 120 and the second ultrasonic receiver 132. Again, the plane on which the second locus 702 resides is parallel to the y-axis 406 and perpendicular to the x-axis 404. The second center point $P_2$ 704 is the point at which the plane defined by the second locus 702 intersects the x-axis 404. As shown in FIG. 7, the second center point $P_2$ 704 is located at a distance $X_2$ 708 from the origin 402 on the x-axis 404.

The second locus 702 may be defined by specifying the distance $X_2$ 708 and the radius $R_2$ 706. As such, in accordance with one embodiment, the second locus determination operation 504 comprises determining $X_2$ 708 and $R_2$ 706. In accordance with one embodiment, the determination of $X_2$ 708 and $R_2$ 706, and hence the determination of the second locus 702, may made employing Equations (5)-(7):

$$L'_2 = \frac{1}{L}((d_{21})^2 - (d_{22})^2) \qquad \text{Equation (5)}$$

$$X_2 = \frac{L + L'_2}{2} \qquad \text{Equation (6)}$$

$$R_2 = \sqrt{(d_{21})^2 - X_2^2} \qquad \text{Equation (7)}$$

As with the Equations (2)-(4), there are a number of ways to implement Equations (5)-(7) in the software and/or firmware. As such, the second locus determination operation 504 is not intended to be limited to any one particular implementation of Equations (5)-(7).

Following the second locus determination operation 504, a determine inclination angle operation 506 determines a first inclination angle $\theta_1$ 804, and a second inclination angle $\theta_2$ 802. As shown in FIG. 8, the angle $\theta_2$ 804 represents the angle, as measure from the z-axis, at which the first ultrasonic transmitter 118 is located on the first locus 602. Similarly, the angle $\theta_2$ 802 represents the angle, as measured from the z-axis, at which the second ultrasonic transmitter 120 is located on the second locus 702. In this embodiment, the angles $\theta_2$ and $\theta_1$ are represented as angles measured in a clockwise direction from the z-axis 408, as viewed from the origin looking in the positive x direction. The difference between the second angle $\theta_2$ 802 and the first angle $\theta_1$ 804 may be represented as $\beta$, where $\beta = \theta_2 - \theta_1$.

In accordance with one embodiment, the determine inclination angle operation 506 may made employing Equations (8)-(14):

$$C = X_2 - X_1 \qquad \text{Equation (8)}$$

$$W = \frac{R_1^2 + R_2^2 + C^2 - P^2}{2 \times R_1 \times R_2} \qquad \text{Equation (9)}$$

$$\beta = \pm \arccos(W) \qquad \text{Equation (10)}$$

In solving Equation (9), it should be noted that P is the distance 808 between the first ultrasonic transmitter 118 and the second ultrasonic transmitter 120 of the stylus. It should also be noted that there are two solutions to Equation 10. However, only the solutions to Equation (16), described below, should be deemed valid.

Since the stylus tip 112 must be in contact with the writing material 106 for the operations 500 to be taking place, the values of $\theta_2$ and $\theta_1$ can then be determined using the following equations:

$$\lambda = \frac{P'}{P} \qquad \text{Equation (11)}$$

In solving Equation (11), it should be noted that P' is the distance 806 between the first ultrasonic transmitter 118 and the tip 112 of the stylus.

$$\phi = \arctan\left[\frac{\lambda R_2 \cos(\beta) - R_1(1+\lambda)}{\lambda R_2 \sin(\beta)}\right] \qquad \text{Equation (12)}$$

In solving Equation (12), it should be noted that the variable $\phi$ is a temporary variable that is used for calculation purposes only. That is, $\phi$ does not correspond directly to a physically measurable angle.

Since there were two solutions for $\beta$ with respect to Equation (10), $\beta$ and $-\beta$, Equation (12) can likewise be solved for two values of $\phi$, as follows:

$$\phi_1 = \arctan\left[\frac{\lambda R_2 \cos(\beta) - R_1(1+\lambda)}{\lambda R_2 \sin(\beta)}\right] \qquad \text{Equation (12-1)}$$

$$\phi_2 = \arctan\left[\frac{\lambda R_2 \cos(-\beta) - R_1(1+\lambda)}{\lambda R_2 \sin(-\beta)}\right] \qquad \text{Equation (12-2)}$$

Using Equation (13), we can then solve for $\theta_1$ as follows:

$$\theta_1 = \phi \text{ or } \phi + \pi \qquad \text{Equation (13)}$$

Since there were two solutions for $\phi$ with respect to Equation (12), $\phi_1$ and $\phi_2$, Equation (13) can be solved for four values of $\phi_1$, as follows:

$$\theta_{11} = \phi_1 \qquad \text{Equation (13-1)}$$

$$\theta_{12} = \phi_2 \qquad \text{Equation (13-2)}$$

$$\theta_{13} = \phi_1 + \pi \qquad \text{Equation (13-3)}$$

$$\theta_{14} = \phi_2 + \pi \qquad \text{Equation (13-1)}$$

Having solved for $\theta_1$, Equation (14) allows us to solve for $\theta_2$.

$$\theta_2 = \theta_1 + \beta \qquad \text{Equation (14)}$$

Since there were four solutions for $\theta_1$ with respect to Equation (12), $\theta_{11}$, $\theta_{12}$, $\theta_{13}$, and $\theta_{14}$, Equation (13) can be solved for four values of $\theta_2$, two values that correspond to each of positive and negative beta ($\beta$ and $-\beta$).

As will be appreciated by those skilled in the art, there are a number of ways to implement Equations (8)-(14) in the software and/or firmware. As such, the determine inclination angle operation 506 is not intended to be limited to any one particular implementation of Equations (8)-(14).

Next, the determine position operation 508 determines the location of the stylus tip 112, with respect to the x-axis and y-axis. That is, the determine position operation 508 determines an (x, y) coordinate pair specifying the location of the stylus tip 112 relative to the origin 402. In accordance with one embodiment, the determine position operation 508 may be made employing Equations (15)-(16) below. More particularly, the value of x may be determined using Equation (15), as follows:

$$x = (1+\lambda)X_1 - \lambda X_2 \qquad \text{Equation (15)}$$

There is precisely one value of x that satisfies Equation (15). As will be appreciated by those skilled in the there are a number of ways to implement Equation (15) in the software and/or firmware. Additionally, there are a number of ways to combine and substitute the appropriate equations from Equations (2)-(14) to arrive at other forms of Equation (15).

The value of y may be determined using Equation (16), as follows:

$$y = (1+\lambda)R_1 \sin(\theta_1) - \lambda R_2 \sin(\theta_2) \qquad \text{Equation (16)}$$

As previously described, there are four possible values for $\theta_1$ and four possible values for $\theta_2$. However, in solving for y in Equation (16), only the result which produces a non-negative value for y, and for which the angle $\theta_2$ satisfies $|\theta_2| < 90$ degrees, will be deemed valid.

As will be appreciated, there are a number of ways to implement and solve for Equation (16) in the software and/or firmware. However implemented and solved, only non-negative solution for y will then be deemed valid. This non-negative solution of y, together with the determined value of x, comprise the x-y coordinate of the pen tip.

Following a determine position operation 508, a store position of stylus tip operation 510 stores the position (x,y) of the stylus tip in a stylus tip position file. In the case where each of the operations 500 is performed in the base unit 104, these positions will be stored in the memory 308 of the base unit 104.

In an embodiment where some or all of the operations 500 are performed in a computing device or process outside of the base unit 104, these positions will be stored in memory that is accessible by the computing device or process located outside of the base unit 104. As will be appreciated, after the operations 500 have been performed a number of times, the stylus tip position file will contain a number of points specifying the location of the stylus tip 112 over a given time period.

In an embodiment where each of the operations 500 are performed in the base unit 104, and where the positions are stored in the memory 308 of the base unit 104, a transmit position of stylus tip operation 512 may be used to transmit the positions of the stylus tip, as recorded in the stylus tip position file, to a computing device or computing process external to the base unit 104. In one embodiment, the transmission of the stylus tip position file to a computing device or computing process will occur at some time after the file has been created. For example, the stylus tip positions may be stored while the electronic stylus system is being used at a location remote from the computing device or process. Then, when convenient, the stylus tip position file may be transmitted to, the computing device or process. Alternatively, the transmission of the stylus tip position file to the computing device or computing process may occur in real time. As previously described, the stylus tip position file may be transferred to the external computing device or computing process via the data transfer port 142. As also previously noted, the data transfer port 142 may comprise a physical or wired connection port, a wireless connection port, or a removable non-volatile memory device.

In an embodiment where each of the operations 500 are performed in a computing device or computing process external to the base unit 104, either the measured distance between the ultrasonic transmitters and ultrasonic receivers, or the measured times required for the ultrasonic signals to travel between the ultrasonic transmitters and ultrasonic receivers, will be stored in the memory. These distance or time measurements, or a series of these distance or time measurements, would then be transferred to the external computing device or computing process for processing according to the operations 500.

Although various embodiments set forth herein have been described in language specific to structural features and/or methodological steps, it is to be understood that the invention defined in the appended claims is not necessarily limited to the specific features or steps described. Rather, the specific features and steps are disclosed as representative forms of implementing the claimed invention.

The invention claimed is:

1. A method comprising:
   determining a locus of positions of a first ultrasonic transmitter in an electronic stylus relative to a given reference point;
   determining a locus of positions of a second ultrasonic transmitter in the electronic stylus relative to the given reference point; and
   determining a position of a writing tip in the electronic stylus relative to the given reference point using the determined locus of positions of the first ultrasonic transmitter, determined locus of positions of the second ultrasonic transmitter, and relative positions of the first ultrasonic transmitter, the second ultrasonic transmitter, and the writing tip within the stylus, wherein determining the locus of positions of the first ultrasonic transmitter comprises:
   emitting an electromagnetic signal from an electromagnetic transmitter in the electronic stylus;
   receiving the electromagnetic signal at a first electromagnetic receiver;
   emitting an ultrasonic signal from the first ultrasonic transmitter;
   receiving the ultrasonic signal at a first ultrasonic receiver, wherein the electromagnetic signal specifies from which of the first and second ultrasonic transmitters the received ultrasonic signal was emitted; and
   calculating a distance ($d_{11}$) between the first ultrasonic transmitter and the first ultrasonic receiver based on a difference in time between when the electromagnetic signal was received and when the ultrasonic signal was received,
   wherein the first ultrasonic transmitter and the second ultrasonic transmitter alternately transmit ultrasonic signals indicating that the writing tip is in contact with a writing material.

2. The method of claim 1, wherein the given reference point is located in an electronic stylus base receiver unit including the first ultrasonic receiver and a second ultrasonic receiver.

3. The method of claim 2, wherein the given reference point is located at the first ultrasonic receiver of the base receiver unit.

4. The method of claim 3, wherein the locus of positions of the first ultrasonic receiver, relative to the reference point, is further determined by calculating a distance ($d_{12}$) between the first ultrasonic transmitter and the second ultrasonic receiver.

5. The method of claim 4, wherein the locus of positions of the second ultrasonic receiver is determined by calculating a distance ($d_{21}$) between the second ultrasonic transmitter and the first ultrasonic receiver and calculating a distance ($d_{22}$) between the second ultrasonic transmitter and the second ultrasonic receiver.

6. The method of claim 2, wherein the first ultrasonic receiver and the second ultrasonic receiver of the base unit are located at a fixed distance from one another in the base unit, and wherein the fixed distance between the first and second ultrasonic receivers is used in determining the location of the tip of the stylus relative to the given reference point.

7. A method of determining a position of a tip of a stylus relative to a coordinate system, the stylus having a first ultrasonic transmitter at a first fixed location in the stylus and a second ultrasonic transmitter at a second fixed location in the stylus, comprising:
   determining a first locus of positions for the first ultrasonic transmitter relative to the coordinate system;
   determining a second locus of positions for the second ultrasonic transmitter relative to the coordinate system;
   determining a first inclination angle of the first ultrasonic transmitter;
   determining a second inclination angle of the second ultrasonic transmitter; and
   determining the location of the tip of the stylus relative to the coordinate system using the first locus of positions, the second locus of positions, the first inclination angle, the second inclination angle, and the locations of the first ultrasonic receiver, the second ultrasonic receiver, and the tip of stylus relative to one another,
   wherein determining the first locus of positions for the first ultrasonic transmitter comprises:

emitting an electromagnetic signal from an electromagnetic transmitter in the stylus;
receiving the electromagnetic signal at a first electromagnetic receiver;
emitting an ultrasonic signal from the first ultrasonic transmitter;
receiving the ultrasonic signal at a first ultrasonic receiver, wherein the electromagnetic signal specifies from which of the first and second ultrasonic transmitters the received ultrasonic signal was emitted; and
calculating a distance between the first ultrasonic transmitter and the first ultrasonic receiver based on a difference in time between when the electromagnetic signal was received and when the ultrasonic signal was received,
wherein the first ultrasonic transmitter and the second ultrasonic transmitter alternately transmit ultrasonic signals indicating that the tip of the stylus is in contact with a writing material.

8. The method of claim 7, further comprising storing the determined location of the tip of the stylus.

9. The method of claim 8, further comprising transmitting the determined location of the tip of the stylus to a computing device.

10. A method comprising
determining a distance between a first ultrasonic transmitter in an electronic pen and a first ultrasonic receiver in a base unit;
determining a distance between the first ultrasonic transmitter in the electronic pen and a second ultrasonic receiver in the base unit;
determining a distance between a second ultrasonic transmitter in the electronic pen and the first ultrasonic receiver in the base unit;
determining a distance between the second ultrasonic transmitter in the electronic pen and the second ultrasonic receiver in a base unit; and
storing each of the determined distances in a non-volatile memory,
wherein determining the distance between the first ultrasonic transmitter and the first ultrasonic receiver comprises:
emitting an electromagnetic signal from an electromagnetic transmitter in the electronic pen;
receiving the electromagnetic signal at a first electromagnetic receiver in the base unit;
emitting an ultrasonic signal from the first ultrasonic transmitter;
receiving the ultrasonic signal at the first ultrasonic receiver, wherein the electromagnetic signal specifies from which of the first and second ultrasonic transmitters the received ultrasonic signal was emitted; and
calculating the distance between the first ultrasonic transmitter and the first ultrasonic receiver based on a difference in time between when the electromagnetic signal was received and when the ultrasonic signal was received,
wherein the first ultrasonic transmitter and the second ultrasonic transmitter alternately transmit ultrasonic signals indicating that a tip of the electronic pen is in contact with a writing material.

11. The method of claim 10, wherein the distance between the first ultrasonic transmitter and the first ultrasonic receiver is determined using a microcontroller in the base unit.

12. The method of claim 11, wherein the distance between the first ultrasonic transmitter and the first ultrasonic receiver is stored in a non-volatile memory in the base unit.

13. The method of claim 12, wherein the stored distance between the first ultrasonic transmitter and the first ultrasonic receiver are transmitted to a computing device.

14. A method of determining a position of the tip of a stylus relative to a coordinate system, the stylus having a first ultrasonic transmitter located at a first fixed location in the stylus and a second ultrasonic transmitter located at a second fixed location in the stylus, comprising:
receiving a distance between a first ultrasonic transmitter in an electronic stylus and a first ultrasonic receiver in a base unit;
receiving a distance between the first ultrasonic transmitter in the electronic stylus and a second ultrasonic receiver in the base unit;
receiving a distance between a second ultrasonic transmitter in the electronic stylus and the first ultrasonic receiver in the base unit;
receiving a distance between the second ultrasonic transmitter in the electronic stylus and the second ultrasonic receiver in a base unit; and
determining the position of the tip of the stylus relative to the coordinate system using the received distances,
wherein the distance between the first ultrasonic transmitter and the first ultrasonic receiver is determined by:
emitting an electromagnetic signal from an electromagnetic transmitter in the electronic stylus;
receiving the electromagnetic signal at a first electromagnetic receiver in the base unit;
emitting an ultrasonic signal from the first ultrasonic transmitter;
receiving the ultrasonic signal at the first ultrasonic receiver, wherein the electromagnetic signal specifies from which of the first and second ultrasonic transmitters the received ultrasonic signal was emitted; and
calculating the distance between the first ultrasonic transmitter and the first ultrasonic receiver based on a difference in time between when the electromagnetic signal was received and when the ultrasonic signal was received,
wherein the first ultrasonic transmitter and the second ultrasonic transmitter alternately transmit ultrasonic signals indicating that the tip of the stylus is in contact with a writing material.

15. A method comprising:
receiving distances between a first ultrasonic transmitter located in a stylus and each of two ultrasonic receivers located in a base unit;
receiving distances between a second ultrasonic transmitter located in the stylus and each of the two ultrasonic receivers; and
determining a location of a tip of the stylus relative to the base unit using the received distances, a fixed distance between the two ultrasonic transmitters, a fixed distance between the two ultrasonic receivers, and a location of the tip of the stylus relative to one of the ultrasonic transmitters,
wherein the distance between the first ultrasonic transmitter and one of the two ultrasonic receivers is determined by:
emitting an electromagnetic signal from an electromagnetic transmitter in the stylus;
receiving the electromagnetic signal at a first electromagnetic receiver in the base unit;
emitting an ultrasonic signal from the first ultrasonic transmitter;
receiving the ultrasonic signal at the one of the two ultrasonic receivers, wherein the electromagnetic signal specifies from which of the first and second ultrasonic transmitters the received ultrasonic signal was emitted; and calculating the distance between the first ultrasonic transmitter and the one of the two ultrasonic receivers based on a difference in time between when the electromagnetic signal was received and when the ultrasonic signal was received, wherein the first ultrasonic transmitter and the second ultrasonic transmitter alternately transmit ultrasonic signals indicating that the tip of the stylus is in contact with a writing material.

16. A method comprising:

receiving a first time values indicative of a time required for an ultrasonic signal to travel between a first ultrasonic transmitter in an electronic pen and a first ultrasonic receiver in a base unit;

receiving a second time value indicative of a time required for an ultrasonic signal to travel between the first ultrasonic transmitter and a second ultrasonic receiver in the base unit;

receiving a third time value indicative of a time required for an ultrasonic signal to travel between a second ultrasonic transmitter in the electronic pen and the first ultrasonic receiver;

receiving a fourth time value indicative of a time required for an ultrasonic signal to travel between the second ultrasonic transmitter and the second ultrasonic receiver; and determining a location of a tip of the electronic pen relative to the base unit using each of the time values, a fixed distance between the two ultrasonic transmitters, a fixed distance between the two ultrasonic receivers, and a location of the tip of the electronic pen relative to one of the ultrasonic transmitters, wherein the time values indicative of the time required for the ultrasonic signal to travel between the first ultrasonic transmitter and the first ultrasonic receiver is determined by:

emitting an electromagnetic signal from an electromagnetic transmitter in the electronic pen;

receiving the electromagnetic signal at a first electromagnetic receiver in the base unit;

emitting an ultrasonic signal from the first ultrasonic transmitter;

receiving the ultrasonic signal at the first ultrasonic receiver, wherein the electromagnetic signal specifies from which of the first and second ultrasonic transmitters the received ultrasonic signal was emitted; and calculating the time required for the ultrasonic signal to travel between the first ultrasonic transmitter and the first ultrasonic receiver based on a difference in time between when the electromagnetic signal was received and when the ultrasonic signal was received, wherein the first ultrasonic transmitter and the second ultrasonic transmitter alternately transmit ultrasonic signals indicating that the tip of the electronic pen is in contact with a writing material.

* * * * *